United States Patent [19]

Naoe

[11] Patent Number: 5,677,980
[45] Date of Patent: Oct. 14, 1997

[54] DECODER FOR COMPRESSED DIGITAL SIGNAL

[75] Inventor: Toshiyuki Naoe, Tokyo, Japan

[73] Assignee: Nippon Steel Corporation, Tokyo, Japan

[21] Appl. No.: 662,310

[22] Filed: Jun. 13, 1996

[30] Foreign Application Priority Data

Jun. 20, 1995 [JP] Japan .................................. 7-176630

[51] Int. Cl.$^6$ .................................................. H04N 5/76
[52] U.S. Cl. ...................... 386/109; 386/112; 386/124; 348/384; 348/390; 348/409; 382/232; 382/236; 382/238
[58] Field of Search .................... 386/109, 112, 386/124, 46, 96, 101, 104; 360/29, 48; 348/384, 390, 420, 409–412, 415; 382/232, 236, 238; H04N 5/76

[56] References Cited

U.S. PATENT DOCUMENTS 5,384,849  1/1995  Jeong ............................... 348/420
5,508,816  4/1996  Ueda et al. ........................ 386/101

*Primary Examiner*—Khoi D. Truong
*Attorney, Agent, or Firm*—Pollock, Vande Sande & Priddy

[57] ABSTRACT

A decoder for decoding compressed data obtained through compression of digital data based on a high efficiency coding technique. The compressed data is processed in units of a predetermined amount of data and the predetermined data unit contains information indicative of a first point of time at which the data unit is to be output from the decoder. The decoder includes a decoding circuit, a time measuring circuit for measuring a second point of time as a timing reference at which the decoding circuit outputs the data, a comparator for comparing a value of the first point of time with a value of the second point of time and/or for comparing a difference value corresponding a subtraction of the value of the second point of time from the value of the first point of time with a predetermined value, and a controller, when the difference value is larger than a predetermined value, for controlling the decoding circuit to cause no output of the data decoded from the data unit including information indicative of the first point of time and to process a next unit.

11 Claims, 6 Drawing Sheets

AUDIO DATA

VIDEO DATA

DECODER FOR COMPRESSED DIGITAL SIGNAL

BACKGROUND OF THE INVENTION

1. Field of the Invention

The present invention relates to decoders for decoding a digital signal compressed based on a data compression technique (high efficiency coding technique) and more particularly, to a decoder for decoding video and audio data compressed using a data compression technique called moving picture experts group (MPEG).

2. Description of the Related Art

In a data compression technique, it is often common to encode input data by remarkably changing the order of the input data and to decode the encoded data by returning the changed order of the data to the initial order. When it is desired to decode a digital signal compressed using such a method, the timing of outputting the decoded data becomes important. This will be explained below in connection with an example of how to process video and audio data based on the MPEG.

The MPEG is a data compression technique which has been recently developed for the purpose of recording or transmitting video data and audio data at a high density. In the data compression technique for video data and audio data according to the MPEG (MPEG video and MPEG audio), there are at present two types of standards, i.e., MPEG1 and MPEG2.

When a bit stream (a bit row) of video and audio data encoded by the compression technique based on the MPEG standards is actually applied to an application, the video data and the audio data are synchronized and multiplexed with each other. The multiplexed bit stream is recorded on a recording medium such as CD-ROM or is transmitted through a transmission medium such as cable or radio wave.

When it is desired to achieve multiplexing between the video and audio data compressed based on the aforementioned MPEG standards, a packet multiplexing system is employed in many cases. In this system, the video and audio data are each divided into bit streams of a suitable length called a packet and each packet is attached with additive information including header.

And the packets of the above video and audio data are multiplexed as suitably switched on a time division multiplexing basis. In this case, the data to be multiplexed, in order to be able to be decoded and reproduced in the course of the bit stream, are treated in units of a pack corresponding to a combination of a plurality of packets. This pack has a pack header at its head part.

FIGS. 5A and 5B show structures of such packet and pack as mentioned above. More specifically, FIG. 5A shows a pack structure of audio data, and FIG. 5B shows a pack structure of video data.

As shown in FIG. 5A, one pack of the audio data is made up of a back header and a packet. Further, one packet is made up of a packet header and a packet data field. Placed in the above packet data field is the compressed audio data of a single or a plurality of frames.

The above pack header includes a pack start code indicative of the head of the pack, system clock reference value information called SCR (system clock reference), and a multiplexing rate of the video and audio data. The above system clock reference value information SCR is used to set and calibrate the value of a system time clock (STC) in an internal timer, which value serves as a reference time, to a value desired at the encoder side.

The above packet header includes a packet start code indicative of the head of the packet, an ID indicative of the type of the bit stream, a packet length indicative of the data length of the packet, STD buffer basic information indicative of the scale or size of a system target decoder (STD) buffer having the audio data to be decoded stored therein, and reproduction output time management information called PTS (presentation time stamp). The reproduction output time management information PTS is used to instruct a time at which first one of frees of the packet data is to be output in reproducing process.

Meanwhile, one pack of the video data has such a structure as shown in FIG. 5B. The video pack is different from the audio pack having such a structure as shown in FIG. 5A in that decoding time management information called DTS (decoding time stamp) is newly added following the reproduction output time management information PTS within its packet header, as will be seen from the drawings.

Here is the reason why the decoding time stamp management information DTS is necessary. In the MPEG1, for the purpose of realizing bidirectional prediction of the video data, three types of pictures, i.e., I, P and B pictures are prescribed. The term "bidirectional prediction" as used herein means to predict a current picture from past and future pictures by using two frame memories. Further, the I picture refers to an intraframe encoded picture, the P picture refers to an interframe (forwardly) predictive encoded picture, and the B picture refers to an interframe bidirectionally predictive encoded picture. These pictures are suitably selectively used to realize the high efficiency coding. Since the coding of the B picture uses the future picture, the frames are rearranged in an order different from the order of the original picture at the time of encoding, which requires the order to be returned to the initial order at the time of decoding. In the decoder, accordingly, the order of frames to be decoded becomes different from that of frames to be output. To avoid this, in the MPEG, the decoding time stamp management information DTS is provided in addition to the reproduction output time management information PTS. When the PTS is different from the DTS at the time of the encoding, time stamps for both of the PTS and DTS are attached to the respective packets, whereas, when the PTS coincides with the DTS with respect to their time stamp, the time stamp is attached only for the PTS.

When it is desired to decode and reproduce such a bit stream of data having a structure mentioned above, the synchronization between the video and audio data is realized on the basis of the reproduction output time management information PTS contained in the above packet header as well as the system clock reference value information SCR contained in the above pack head.

More in detail, first of all, on the basis of the system clock reference value information SCR, the value STC in the internal timer as a reference time is calibrated at a value desired on the encoder side. Thereafter, the value STC of the internal timer being sequentially counted up is sequentially compared with the value of the reproduction output time management information PTS, so that, when the value STC of the internal timer coincides with the value of the reproduction output time management information PTS, the frames of the corresponding packet data begin to be output from its first frame in the reproducing process.

When a relationship of PTS>STC is satisfied, for example, when the reproduction output time management information is 10:00:02 and the internal timer information is 10:00:00, since the reproduction output time is not reached yet, the decoding and reproduction output of the packet data in the packet containing the reproduction output time management information PTS will not be carried out.

After that, when the value STC of the internal timer is increased and 2 seconds later reaches such a relationship of PTS=STC, the decoding and reproduction output of the packet data in the packet containing the reproduction output time management information PTS are started.

When a relationship of PTS<STC is satisfied, for example, when the reproduction-output time management information is 10:00:02 and the internal timer information is 10:00:04, meanwhile, the packet data of the packet having the reproduction output time management information PTS therein is discarded as past data.

When an error took place in a recording, reproducing or transmission system, such a relationship of PTS→→STC may occur that the value of the reproduction output time management information PTS becomes far higher the value STC of the internal timer. When the PTS information is 11:00:00 and the STC information is 10:00:00, for example, the processing of the data according to the aforementioned principle requires it to take one hour until the decoded data is output, during which there is no output from the decoder and the system substantially hangs up undesirably.

SUMMARY OF THE INVENTION

In view of the above problems in the prior art, it is therefore an object of the present invention to prevent a system from hanging up even when an error take place in a recording, reproducing or transmission system.

A decoder in accordance with the present invention decodes compressed data obtained through compression of digital data based on a high efficiency coding technique. The compressed data is processed in units of a predetermined amount of data and the predetermined data unit contains first data indicative of a first point of time at which the data unit is to be output from the decoder.

In accordance with a first aspect of the present invention, the above object is attained by providing a decoder which comprises a decoding circuit for decoding the compressed data into decoded data and for outputting the decoded data; time measuring means for measuring a second point of time as a timing reference at which the decoded data is to be output from the decoding circuit and for outputting second data indicative of the second point of time; comparison means for comparing a value of the first data with a value of the second data and/or for comparing a difference value corresponding to a subtraction of the value of the second data from the value of the first data with a predetermined value; and control means for controlling the decoding circuit on the basis of an output of the comparison means to process a next data unit without outputting the data decoded from the data unit containing the first data when the difference value is greater than the predetermined value.

With the above arrangement, even when an error takes place in a recording/reproducing or transmission system, there can be eliminated such a problem that an output from the decoder becomes null.

In this case, the decoder may include a decoder which decodes video or audio compressed data based on the MPEG standards.

In accordance with a second aspect of the present invention, a decoder includes first and second decoders having such an arrangement as mentioned above and is designed so that the control means in one of the first and second decoders also controls the decoding circuit in the other decoder on the basis of an output of the comparison means to process the next data unit when the difference value is greater than the predetermined value.

With this arrangement, even when an error occurs in one of the first and second compressed data, the first and second decoders can both shift their processing operation to the next data unit at the same time. In particular, when the first compressed data is video compressed data based on the MPEG standards while the second compressed data is audio compressed data based on the MPEG standards, this feature of the present invention is effective for achieving synchronism in output timing between the video and audio signals.

DESCRIPTION OF THE PREFERRED EMBODIMENTS

Embodiments of the present invention will be explained by referring to the attached drawings.

Figure 1:
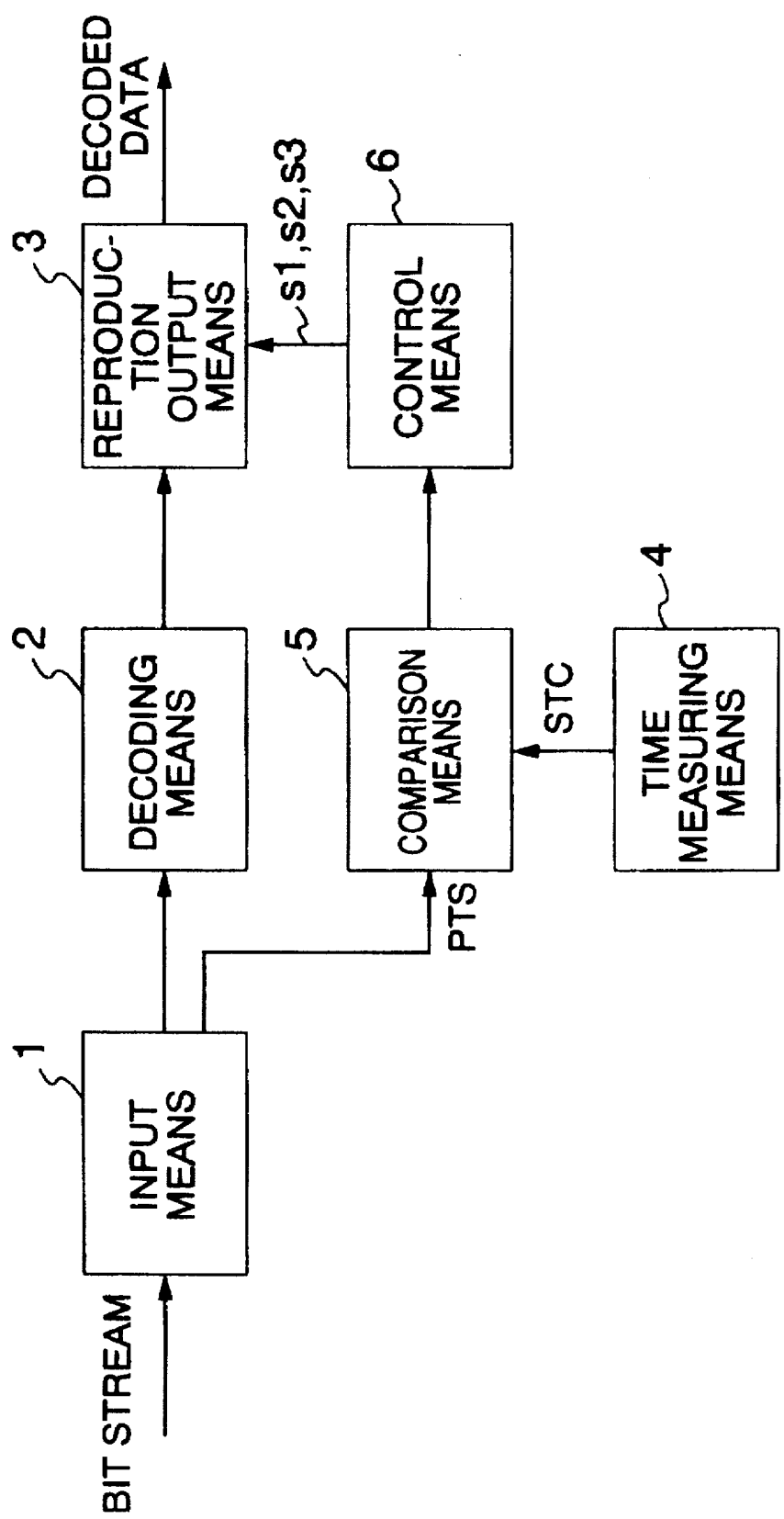
FIG. 1 is a block diagram of an entire arrangement of a decoder in accordance with a first embodiment of the present invention.

Referring first to FIG. 1, there is shown a functional block diagram of a decoder in accordance with a first embodiment of the present invention, showing featured components of the first embodiment in which the invention is applied to an MPEG decoder.

Figure 5A:
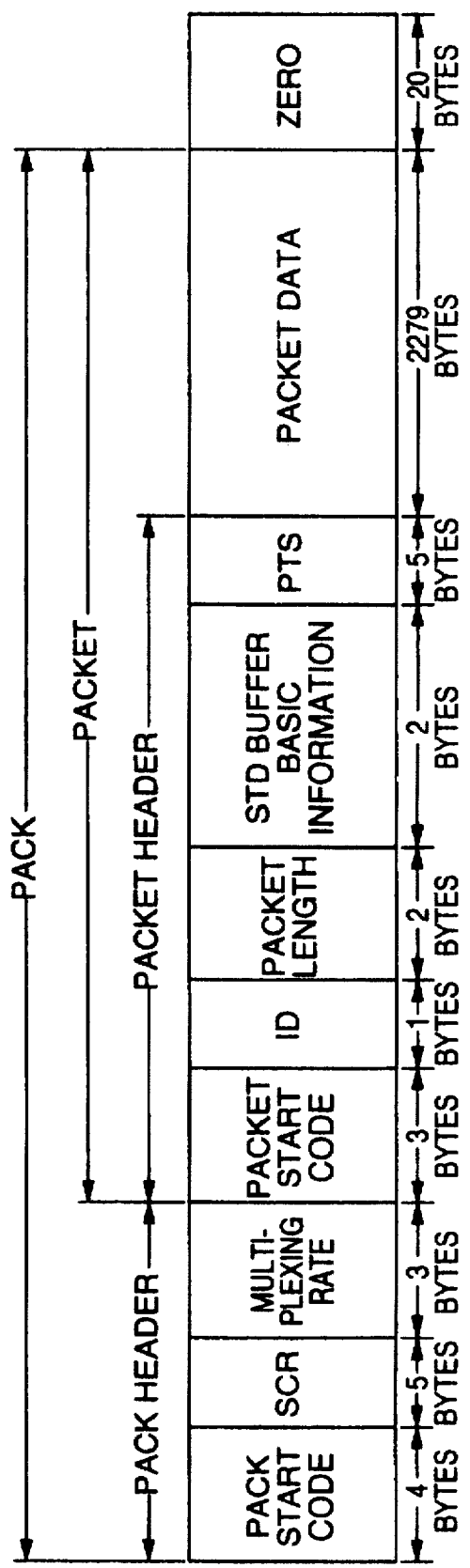
FIG. 5A shows one pack of video data compressed based on the MPEG standards.
Figure 5B:
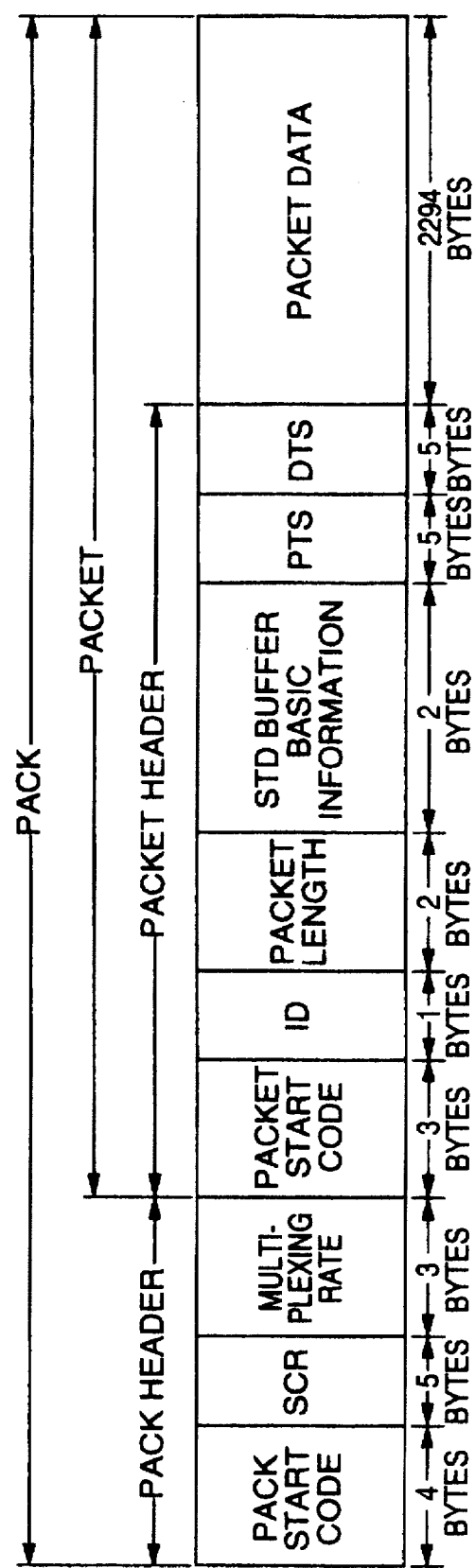
FIG. 5B shows one pack of audio data compressed based on the MPEG standards.

The decoder, shown in FIG. 1 includes an input means 1 for receiving a bit stream in units of such a pack as shown in FIG. 5A or 5B, a decoding means 2 for decoding packet data contained in a packet within the pack inputted by the input means 1, and a reproducing/outputting means 3 for reproducing and outputting the data decoded by the decoding means 2.

Also included in the decoder are a time measuring means 4 for measuring a reference time at which timing the packet data decoded by the decoding means 2 is to be output by the reproduction output means 3, and a comparison means 5 for comparing a value STC measured by the time measuring means 4 with a value PTS of the reproduction output time management information contained in the packet within the pack inputted by the input means 1 to judge a magnitude relationship between the value STC measured by the time measuring means 4 and the value PTS of the reproduction output time management information.

That is, the comparison means 5 judges which one of relationships (1) to (4) as follows is satisfied through the magnitude comparison between the values STC and PTS.

PTS>STC (1)

PTS=STC (2)

PTS<STC (3)

PTS→→STC (4)

A distinction between the relationships (1) and (4) is carried out by judging whether or not a difference between the value of the reproduction output time management information PTS and the measured value STC is greater than a set value (e.g., 2 seconds).

A control means 6 outputs one of first to third control signals s1, s2 and s3 to the reproduction output means 3 according to the comparison result of the comparison means 5 to control the reproduction output timing of the data decoded by the decoding means 2.

More-specifically, when the comparison means 5 judges that the relationship (1) is satisfied, the control means 6 judges that the packet data within the packet having the reproduction output time management information PTS contained therein is data which is to be decoded and output within a time of 2 seconds thereafter, and outputs to the reproduction output means 3 the first control signal s1 to prevent the packet data from being output at the current time point.

When the comparison means 5 judges that the relationship (2) is satisfied, the control means 6 outputs to the reproduction output means 3 the second control signal s2 to start outputting the packet data within the packet having the reproduction output time management information PTS contained therein. When the comparison means 5 judges that the relationship (3) is satisfied, the control means 6 outputs to the reproduction output means 3 the third control signal s3 to cause the packet data within the packet having the reproduction output time management information PTS contained therein to be discarded as past data.

Further, when the comparison means 5 judges that the relationship (4) is satisfied, the control means 6 outputs to the reproduction output means 3 such a control signal as to cause the packet data within the packet having the reproduction output time management information PTS contained therein not to be output and as to cause control to be shifted to the next packet processing. For example, when this control signal is the same as the third control signal s3 issued to the reproduction output means 3 to discard the packet data when the relationship (3) is satisfied, the aforementioned function can be realized.

With such an arrangement as mentioned above, the reproduction output operation is put in its wait state until the time indicated by the reproduction output time management information PTS contained in the packet of the pack is reached; while, as soon as the time is reached, the decoded packet data starts to be output. As a result, the reproduction output operation of the decoded data is carried out in synchronism with the time indicated by the reproduction output time management information PTS.

When the relationship (4) is satisfied, that is, when it takes a considerable time from the current time point until the time indicated by the reproduction output time management information PTS, the packet data within the packet having the reproduction output time management information PTS contained therein is discarded. As a result, the processing of the next packet is immediately carried out so that, when a difference between the time indicated by the reproduction output time management information PTS and the current time is great, there can be eliminated such a disadvantage that the output of the decoder becomes null for a long time and the system substantially hangs up. In this connection, when the packet to be discarded is located at the last position of the pack or when the pack contains only a single packet, the word "next packet" refers to the next pack.

Although the control means 6 is designed to output the first to third control signals s1, s2 and s3 to the reproduction output means 3 to control the operation of the reproduction output means 3 in the present embodiment, these control signals may be output to the decoding means 2 to control the operation of the decoding means 2 while achieving the same processing as the above.

Figure 2:
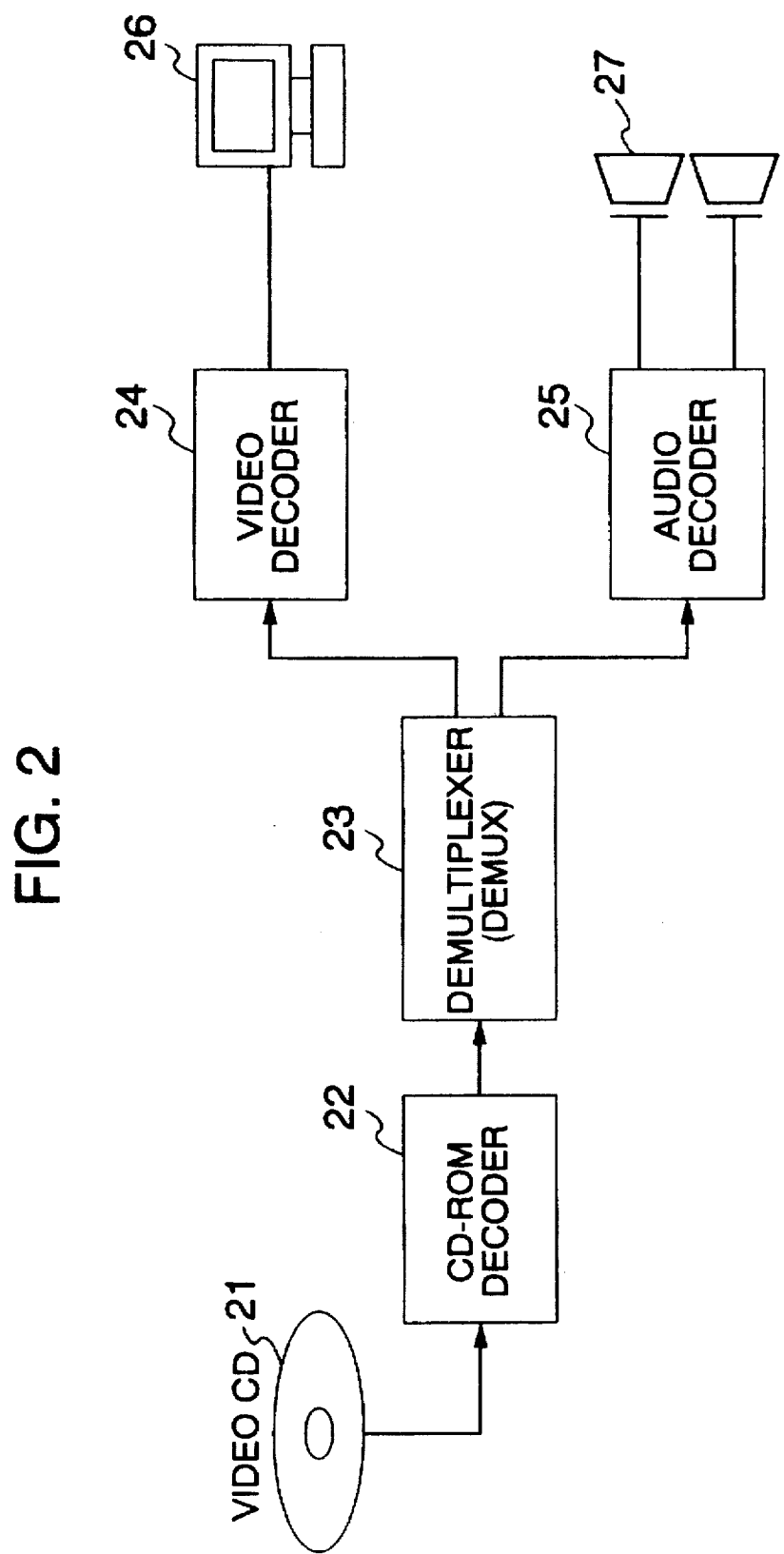
FIG. 2 schematically shows an entire arrangement of a decoding/reproducing system for data compressed based on MPEG standards.

Schematically shown in FIG. 2 is an entire arrangement of a decoding/reproducing system for data compressed based on the MPEG standards.

The system shown in FIG. 2 includes a video CD 21 in which multiplexed streams of video and audio data compressed based on the MPEG standards are recorded, a CD-ROM decoder 22 for extracting the multiplexed streams of recorded data from the video CD 21 therefrom, and a demultiplexer (DEMUX) 23 for receiving the extracted multiplexed streams of data from the CD-ROM decoder 22.

The demultiplexer (DEMUX) 23 demultiplexes or separates the multiplexed streams of data extracted from the CD-ROM decoder 22 into such individual bit streams of data of audio and video as shown in FIGS. 5A and 5B. A video decoder 24 receives from the demultiplexer (DEMUX) 23 such a bit stream of video data separated by the demultiplexer (DEMUX) 23 as shown in FIG. 5B, and decodes and reproduces the video data. An audio decoder 25 receives from the demultiplexer (DEMUX) 23 such a bit stream of audio data separated by the demultiplexer (DEMUX) 23 as shown in FIG. 5A, and decodes and reproduces the audio data.

A display unit 26 displays thereon a video image reproduced by the video decoder 24. A loudspeaker 27 outputs a PCM voice reproduced by the audio decoder 25. In the present embodiment, the above video decoder 24 and audio decoder 25 are each arranged as shown in FIG. 1 and each detailed structure is implemented by such a structure as shown in FIG. 3.

Figure 3:
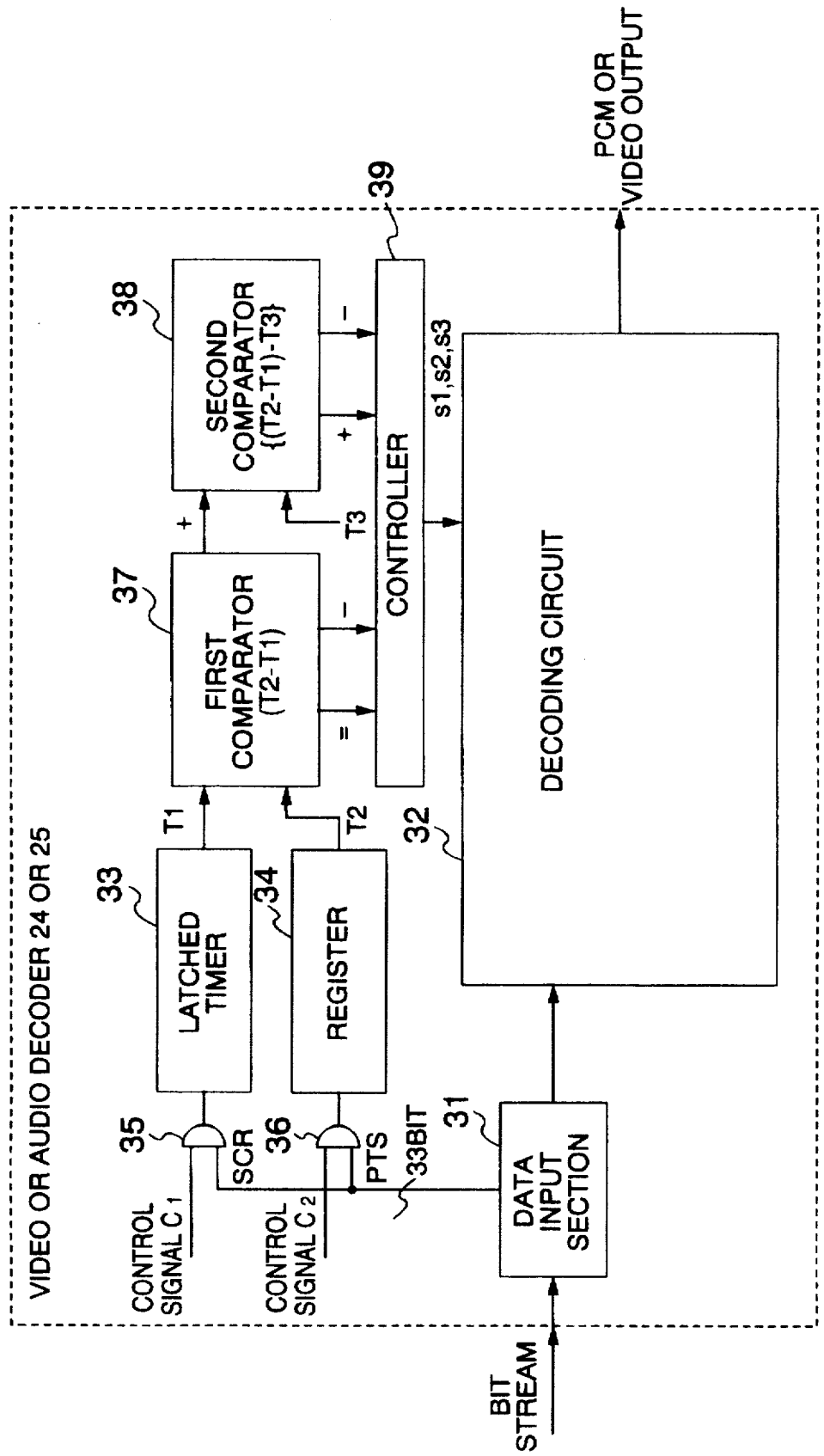
FIG. 3 shows a detailed arrangement of the decoder in accordance with the first embodiment of the present invention.

In FIG. 3, a data input unit 31 receives such a bit stream of audio or video data as shown in FIG. 5A or 5B. A decoding circuit 32 receives the bit stream from the data input unit 31, decodes and outputs the packet data contained in the bit stream.

A timer 33 having a latch measures a current time T1 (corresponding to the value STC measured by the above time measuring means 4) as a timing reference at which timing the packet data decoded by the decoding circuit 32 is to be reproduced and output.

More specifically, the latched timer 33 first sets the time reference value at a value wished on the encoder side on the basis of the system clock reference value information SCR received from the data input unit 31 via an AND gate 35, and then performs its count-up operation on the basis of the set value used as a reference. A control signal $C_1$ is used to enable an input of the system clock reference value information SCR to the latched timer 33.

A register 34 holds therein the value of the reproduction output time management information PTS received from the data input unit 31 via an AND gate 36. A control signal $C_2$ is used to enable an input of the reproduction output time management information PTS to the register 34. In the following explanation, the time indicated by the reproduction output time management information PTS is denoted by T2.

A first comparator 37 compares a time T1 measured by the latched timer 33 with the time T2 indicated by the reproduction output time management information PTS.

A second comparator 38 compares a value (T2−T1) received at its one input terminal from the first comparator 37 with a time T3 indicative of a preset time (e.g., 2 seconds) received at the other input terminal. The second comparator 38, when the first comparator 37 determines that a relationship of T1<T2 is satisfied, compares the above value (T2−T1) with the value T3.

A controller 39 outputs one of the first to third control signals s1, s2 and s3 to the decoder circuit 32 according to the comparison results of the first and second comparators 37 and 38 to control the reproduction output timing of the data decoded by the decoding circuit 32.

More in detail, when the first comparator 37 determines that the relationship of T1<T2 is satisfied and when the second comparator 38 determines that a relationship of (T2−T1)≦T3 is satisfied, the controller 39 outputs the first control signal s1 to the decoding circuit 32 to inform that the packet data within the packet having the reproduction output time management information PTS contained therein as data to be decoded and output within 2 seconds and to prevent the packet data from being output at the current time.

The controller 39, when the first comparator 37 determines that a relationship of T1=T2 is satisfied, also outputs the second control signal s2 to the decoding circuit 32 to decode and output the packet data within the packet having the reproduction output time management information PTS contained therein. As a result, at the time point of the time indicated by the reproduction output time management information PTS, the output of the decoded packet data is started.

Further, when the first comparator 37 judges the satisfaction of the relationship of T1>T2, the controller 39 outputs the third control signal s3 to the decoding circuit 32 to discard as past data the packet data within the packet having the reproduction output time management information PTS contained therein. In this case, the decoding circuit 32 receives a bit stream of the next pack and carried out its decoding operation thereover.

When the first comparator 37 determines the satisfaction of the relationship of T1<T2 and the second comparator 38 determines the satisfaction of the relationship of (T2−T1)>T3, next, the controller 39 outputs to the decoding circuit 32 a control signal instructing not to output the packet data within the packet having the reproduction output time management information PTS contained therein but instructing the shift of control to the processing of the next packet, for example, the third control signal s3 instructing to regard the above packet data as past data and to discard it.

Though the two comparators 37 and 38 have been used to judge the magnitude relationship between the times T1 and T2 in the foregoing embodiment, any arrangement may be employed so long as the arrangement enables realization of the similar judgement.

As has been explained in the foregoing, in accordance with the present embodiment, when it takes a considerable time from the current time point until the time indicated by the reproduction output time management information PTS, the packet data within the packet having the reproduction output time management information PTS contained therein is discarded and the processing of the next packet is immediately carried out. As a result, there can be eliminated such a disadvantage that, when a difference between the time indicated by the reproduction output time management information PTS and the current time is great, the output of the decoder becomes absent for a long time and the system substantially hangs up.

Explanation will then be made as to a second embodiment of the present invention in which the invention is also applied to an MPEG decoder.

The information including the system clock reference value information SCR or the reproduction output time management information PTS already explained in the first embodiment is used, when it is desired to reproduce video and audio signals from the video CD 21 in FIG. 2 for example, to achieve synchronism between the both signals. Accordingly, when the shift of control to the processing of the next packet in one of the video decoder 24 or audio decoder 25 is also used to simultaneously cause the shift of control to the processing of the next packet in the other decoder, accurate synchronism can be always achieved between the vide and audio signals.

Figure 4:
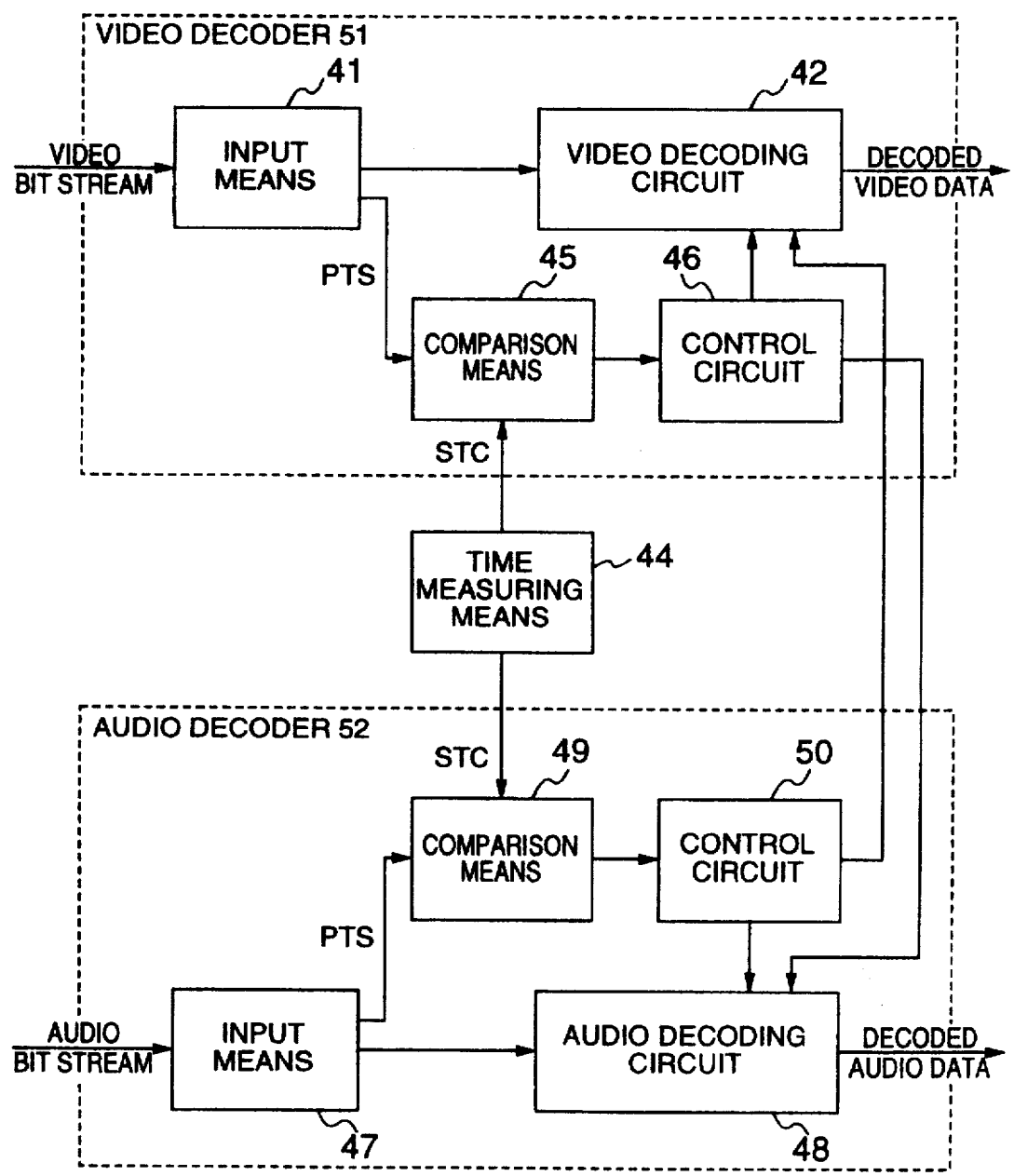
FIG. 4 is a block diagram of an entire arrangement of a decoder in accordance with a second embodiment of the present invention.

FIG. 4 shows a block diagram of an entire configuration of a decoder in accordance with the second embodiment of the present invention, wherein a time measuring means 44 is shared by both video and audio systems. The second embodiment includes a video decoder 51 and an audio decoder 52. The video decoder 51 has an input means 41 for receiving a bit stream of video data, a video decoding circuit 42 for decoding packet data contained in the bit stream of video data and for outputting the decoded video data, a comparison means 45 for comparing the information PTS received from the input means with the information STC received from the time measuring means, and a control circuit 46 for controlling the video decoding circuit on the basis of an output of the comparison means. Similarly, the audio decoder 52 has an input means 47 for receiving a bit stream of audio data, an audio decoding circuit 48 for decoding packet data contained in the bit stream of audio data and for outputting the decoded audio data, a comparison means 49 for comparing the information PTS received from the input means with the information STC received from the time measuring means, and a control circuit 50 for controlling the audio decoding circuit on the basis of an output of the comparison means. In the illustrated example, the control circuit 46 of the video decoder 51 also controls the audio decoding circuit 48, while the control circuit 50 of the audio decoder 52 also controls the video decoding circuit 42.

In accordance with the present embodiment, when the value of the reproduction output time management information PTS becomes larger by a predetermined value than the value STC measured by the time measuring means in one of the video decoder 51 and audio decoder 52, such control can be effected that control is shifted to the processing of the next packet not only in one decoder but also in the other decoder. As a result, in the case where a difference between the current time and the time at which decoded data is to be output becomes so large in either one of the video decoder 51 and the audio decoder 52 that the decoding and reproduction of the packet data within the packet are not carried out and the decoding and reproduction of packet data contained in the next packet are carried out, a problem of out-of-synchronism between the video and audio data can be removed.

What is claimed is:

1. A decoder for decoding compressed data obtained by compressing digital data based on a high efficiency coding technique, said compressed data being processed in units of a predetermined amount of data, said predetermined data unit including first data indicative of a first point of time at which the data unit is to be output from said decoder, said decoder comprising:

a decoding circuit for decoding the compressed data into decoded data and for outputting the decoded data;

time measuring means for measuring a second point of time as a timing reference at which the decoded data is to be output from said decoding circuit and for outputting second data indicative of the second point of time;

comparison means for comparing a value of the first data with a value of the second data and/or for comparing a difference value corresponding to a subtraction of the value of the second data from the value of the first data with a predetermined value; and control means for controlling said decoding circuit on the basis of an output of said comparison means to process a next data unit without outputting data decoded from the data unit containing the first data when said difference value is greater than said predetermined value.

2. A decoder as set forth in claim 1, wherein said comparison means compares the value of the first data with the value of the second data and, when determining that the value of the first data is larger than the value of the second data, compares the difference value with the predetermined value.

3. A decoder as set forth in claim 1, wherein said control means controls said decoding circuit to output data of the data unit containing the first data when the value of the first data is equal to the value of the second data and controls said decoding circuit to discard the data unit containing the first data when the value of the first data is smaller than the value of the second data.

4. A decoder as set forth in claim 1, wherein said decoder circuit includes reproduction output means for outputting the decoded data.

5. A decoder as set forth in claim 1, wherein said compressed data is video data compressed based on moving picture experts group (MPEG) standards.

6. A decoder as set forth in claim 1, wherein said compressed data is audio data compressed based on moving picture experts group (MPEG) standards.

7. A decoder as set forth in claim 1, wherein said decoder includes first and second decoders for decoding first and second compressed data respectively, and said control means of one of said first and second decoders also controls said decoding circuit of the other of said first and second decoders on the basis of the output of said comparison means to process a next data unit when said difference value is greater than said predetermined value.

8. A decoder as set forth in claim 7, wherein said first and second decoders share said time measuring means.

9. A decoder as set forth in claim 7, wherein said first compressed data is video data compressed based on moving picture experts group (MPEG) standards and said second compressed data is audio data compressed based on the moving picture experts group (MPEG) standards.

10. An MPEG decoder for decoding a compressed signal based on moving picture experts group (MPEG) standards in units of a pack having a plurality of packets each having time management information indicative of a reproduction output time of decoded packet data, said MPEG decoder comprising:

decoding means for decoding packet data contained in the packet of said pack;

reproduction output means for outputting data decoded by said decoding means;

time measuring means for measuring a time as a timing reference at which said decoded data is to be output from said reproduction output means;

judgement means for comparing a value of the time measured by said time measuring means with a value of said time management information to judge whether or not the value of said time management information is larger by a predetermined value than the value of the time measured by said time measuring means; and control means, when said judgement means determines that the value of said time management information is larger by the predetermined value than the value of the time measured by said time measuring means, for controlling said decoding means to process a next packet and controlling said reproduction output means not to output the packet data of the packet containing said time management information.

11. An MPEG decoder as set forth in claim 10, wherein said MPEG decoder includes video and audio MPEG decoders, and said control means of one of said video and audio MPEG decoders mutually controls said decoding means of the other of said video and audio MPEG decoders to process a next packet.

* * * * *